Sept. 4, 1956  G. L. GETLINE  2,761,638
VIBRATION-ISOLATING POWER PLANT MOUNTING SYSTEM
Original Filed May 2, 1950  2 Sheets-Sheet 1
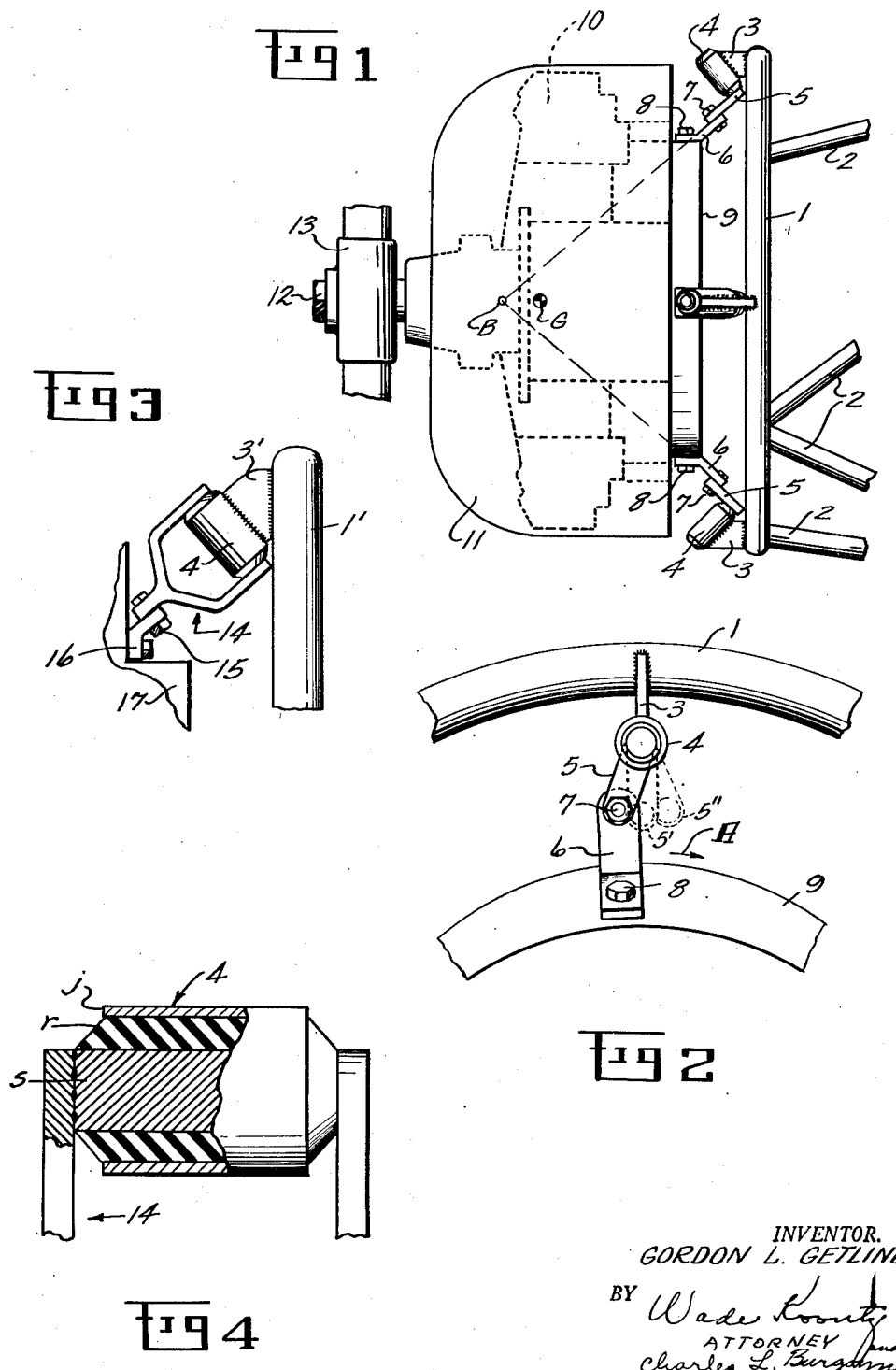
INVENTOR.
GORDON L. GETLINE Sept. 4, 1956   G. L. GETLINE   2,761,638
VIBRATION-ISOLATING POWER PLANT MOUNTING SYSTEM
Original Filed May 2, 1950   2 Sheets-Sheet 2
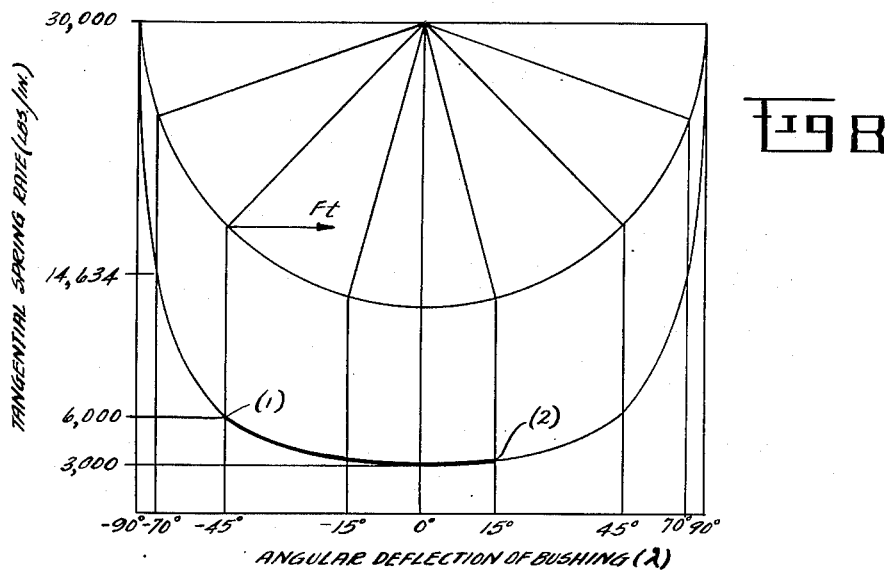
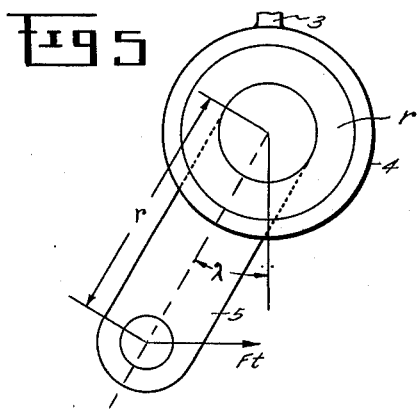
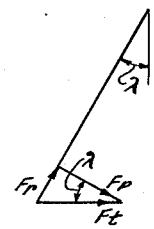
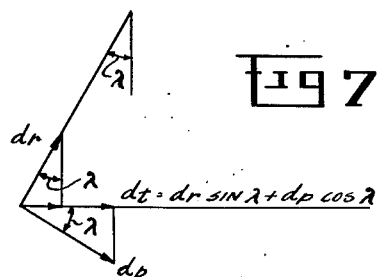
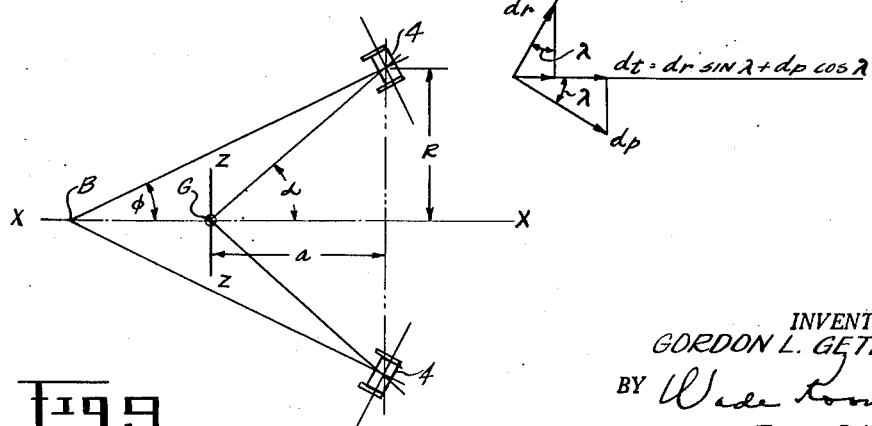
INVENTOR.
GORDON L. GETLINE
BY
ATTORNEY
AGENT

United States Patent Office 2,761,638
Patented Sept. 4, 1956

2,761,638

VIBRATION-ISOLATING POWER PLANT MOUNTING SYSTEM

Gordon L. Getline, Dayton, Ohio

Continuation of abandoned application Serial No. 159,564, May 2, 1950. This application November 17, 1953, Serial No. 392,773

4 Claims. (Cl. 248—5)

(Granted under Title 35, U. S. Code (1952), sec. 266)

The invention described herein may be manufactured and used by or for the United States Government for governmental purposes without payment to me of any royalty thereon.

The present invention relates to a vibration-isolating power plant mounting system particularly intended for use on aircraft and is a continuation of the invention disclosed in my copending application Serial Number 159,564 filed May 2, 1950, now abandoned, directed to similar subject matter.

The primary object of this invention is to provide a power plant mounting system having a flexibility inversely proportional to the engine speed.

A further object of the invention is to provide a power plant mounting system for aircraft including a plurality of resilient vibration-isolating mounting units each having a tubular rubber bushing bonded to relatively movable inner and outer elements and so arranged with respect to the power plant axis of rotation and center of gravity as to obtain low stiffness in the pitch-vertical and yaw-lateral modes of vibration without excessive deflections of the relatively movable inner and outer elements in roll induced by engine torque.

Another object of the invention is to provide a vibration-isolating power plant mounting system for aircraft including a plurality of resilient mounting units each having a tubular rubber bushing bonded to relatively movable inner and outer elements and wherein the mounting units are arranged with the axes of the rubber bushings lying in planes containing the torque axis of the power plant and wherein the mounting units are distributed around the power plant at evenly spaced intervals and equally spaced from the torque axis of the power plant.

Another object of the invention is to provide a vibration-isolating power plant mounting system for propeller driven aircraft including a plurality of resilient mounting units each having a tubular rubber bushing bonded to relatively movable inner and outer mounting elements attached respectively to the power plant and to the aircraft frame and to arrange the mounting units in such a manner with respect to the torque axis and the center of gravity of the power plant and propeller as to obtain low natural frequencies of vibration in the modes of vibration excited by residual propeller unbalance, that is in pitch-vertical and yaw-lateral modes, while at the same time maintaining the roll or torque-induced deflections of the mounting units or movable parts thereof within permissible limits.

Another object of the invention is to provide a vibration-isolating mounting system for engine-propeller combinations as used on aircraft and to arrange the resilient mounting units of the mounting system so as to obtain low natural frequencies of vibration in the modes excited by residual propeller unbalance.

A further object of the invention is to provide a vibration isolating mounting that is resilient at low engine speeds and less resilient at high engine speeds.

Another object of the invention is generally to improve the vibration-isolating characteristics of aircraft engine mounting systems including tubular rubber bushings bonded to relatively movable inner and outer mounting elements adapted for attachment to the engine and aircraft frame.

The above and other objects of the invention will become apparent upon reading the following description in conjunction with the drawings, in which:

Fig. 1 is a side elevation view of a typical airplane engine as it would appear when mounted on the forward part of an airplane by the use of the present mounting system.

Fig. 2 represents a view taken on line 2—2 of Fig. 1 of one of the engine mounting units as used in the present engine mounting system.

Fig. 3 is a side elevation view of a modified form of engine mounting unit which may be substituted for that shown in Figs. 1 and 2.

Fig. 4 is a fragmentary view partly in cross section of the engine mounting unit of Fig. 3 and showing the jacketed rubber bushing as used in both forms of the mounting unit.

Fig. 5 is a plan view of a single engine mounting unit to show certain geometrical quantities and relations.

Fig. 6 is a vector diagram of tangential forces acting on the resiliently mounted link of each mounting unit.

Fig. 7 is a vector diagram of tangential deflections of the resiliently mounted link of each mounting unit.

Fig. 8 is a graph to show the quantitative relation between angular deflections of the rubber bushing of each mounting unit and the tangential spring rate of each bushing.

Fig. 9 is a diagrammatic side elevation of the power plant mounting system to show certain design considerations in adapting a plurality of mounting units to produce a complete power plant mounting system in accordance with the present invention.

For a description of the present power plant mounting system reference is first made to Fig. 1 of the drawing. Here there is shown an engine mounting ring 1 supported on the aircraft frame by means of struts 2 welded securely on the ring. At evenly spaced points on the periphery of the mounting ring there are welded bracket plates 3 which are in turn welded or otherwise rigidly secured to steel-jacketed rubber bushings 4 having a construction as appears in Fig. 4. The axis of the bushing is inclined at an acute angle to the plane of the mounting ring, and is in a plane defined by the intersection of a perpendicular to a tangent to the ring and the radius of the ring. The rubber bushing is adhered, as by vulcanizing, to the cylindrical jacket and to a central rock-shaft S. Rigid with and perpendicular to the central rock-shaft S of each bushing is a link arm 5 connected at the outer end to an engine-carried arm or bracket 6, see Fig. 1, the connection being made by a pivot 7 lying parallel at all times to the central rock-shaft within the mounting bushing. The pivot connection 7 should be of an anti-friction type or at least some efficient type of bearing developing a minimum of friction so as to prevent possible binding at the pivot points 7.

The engine-carried bracket arms 6 are rigidly connected to the engine crackcase, as by means of bolts 8. The engine crackcase 9 forms the central frame of a radial aircraft engine 10, enclosed by a typical sheet metal cowling 11. The engine crackshaft 12 projects forwardly and has a propeller hub 13 rigidly mounted thereon. The mounting and attachment of the engine supporting devices is accomplished with each link or arm 5 extending at an obtuse angle to the plane containing the axis of the bushing, defined above as seen in Fig. 2. In this view the solid line position of arm 5 corresponds to the static condition, that is with the engine not running. When the engine is operating in a counterclockwise direction the reaction on the engine crankcase causes it to be displaced in a clockwise direction, as indicated by the arrow A. The link or arm 5 then assumes positions as indicated in dotted lines at 5' or 5'' and the extent of this displacement away from the static position will depend on the speed of rotation of the engine, assuming of course that the propeller is fixed to the crackshaft to provide an engine load. The rotation of the engine crankcase from the static position to the load position through a small angle is termed the engine wind-up. This wind-up action imposes in sequence a torsional shear stress and then radial compression on the bushing 4. This effect on the bushing 4 is caused by the movement of link arm 5 and bracket arm 6 into a position of alignment as the engine speed increases, as seen in Fig. 2. Since torsional shear stress offers substantially less resistance than does radial compression by the bushing, the engine mounting will be very flexible during starting conditions and will become progressively stiffer as engine speed increases. This feature is of paramount importance since excessive engine vibration during starting requires a flexible mounting and high speed operation requires a rigid mounting.

A modified form of the engine mounting element or device is shown in Figs. 3 and 4 and in most respects is quite similar to the first described form of the invention. The engine mounting ring 1' is provided with a fixed bracket or plate 3' on which is rigidly secured a bushing 4, just as in Fig. 1. The bushing includes a metal sleeve or jacket $j$ enclosing a rubber sleeve $r$ having a rock-shaft $s$ extending therethrough centrally thereof. The rubber sleeve is bonded securely to the jacket $j$ and to the rock-shaft $s$. Rigidly secured to the ends of the rock-shaft, as by welding, are similar parallel arms of a divided link 14, and the other end of the link is pivoted at 15 to a fixed bracket 16 mounted on the engine crackcase 17. It is understood that the link 14 will have a static position similar to that of link 5 in Fig. 2, that is its longitudinal axis will extend at an acute angle to a radial plane extending through the fixed bushing. As in the first described form of the invention there will be provided a plurality of mounting devices, three or more, spaced uniformly about the engine mount ring. In both forms of the invention the planes of swing of the resiliently mounted links 5 and 14 preferably intersect the central axis of the engine at a point B slightly forward of the center of gravity G of the engine and propeller. In all forms of the invention it is understood that the number of vibration isolating mounting units required will depend on the size and horsepower of the engine as well as the capacity of each mounting unit. Furthermore the use of the engine with a gear reduction unit between the engine and propeller causes an increase in torsional force on the engine mounting units which must be considered in installations of this type.

An airplane engine-propeller combination as indicated at 10 in Fig. 1 is naturally subject to considerable vibration when running due to the rotating and reciprocating masses, the progressive explosions in the cylinder heads distributed around the engine and the aerodynamic unbalances of the propeller. Thus the static mass of the engine and propeller is subject to dynamic loads when the power plant is operating and the distribution of these loads becomes complex. In general the natural frequencies of vibration in the pitch-vertical and yaw-lateral modes are controlled mainly by the axial shear and radial compression spring rates of the individual bushings of the mounting units. The natural frequency of vibration in roll is controlled independently by the torsional shear and radial compression spring rates in the present engine mounting system and by use of the present system this torsional vibration is taken care of in a unique, efficient and satisfactory manner.

The individual engine mounting units uniformly spaced around the mounting ring each serves to counterbalance or resist power plant torque to an equal extent and in exactly the same manner. Thus the detailed discussion to follow will deal with only a single engine mounting unit. The torque acting on each unit may be represented by a force vector $Ft$ acting on the link or arm 5 in a direction tangent to the circle extending through the engine connected end of each link (see Fig. 5) or through the pivot point 7. This force acts on the resilient bushing or sleeve at the end of a lever arm as determined by the length $r$ of the arm 5 and the magnitude of the angle $\lambda$. The angle $\lambda$ will be taken as the angle of displacement of the arm or link 5 away from the central or radial position and displacements to the right and left thereof will be considered as plus and minus values of the angle. Thus it will be seen that the stiffness of the engine mounting unit in roll due to engine torque will be at a minimum for a zero value of angle $\lambda$, that is when the tangential force $Ft$ acts perpendicular with respect to the length of arm 5. Also the stiffness in roll will increase as the arm 5 departs from this zero position, because the force $Ft$ must now be resolved into forces acting along the arm $5(Fr)$ and at a right angle to the arm $5(Fp)$, as illustrated by the diagram of Fig. 6 where $\lambda$ is chosen as —30 degrees. In this condition the force vector $Fp$ is acting to twist the resiliently mounted arm 5 while the force vector $Fr$ is acting to compress the rubber bushing radially. This increasing stiffness on either side of the zero position is advantageous, especially on the plus side of zero because with steady increase in torsional spring rate toward full power operation the rate of wind-up of the arm 5 will decrease to provide a self-limiting action on rotative displacement of the engine about its torque axis. Excessive rotary displacement should be avoided to minimize piping and wiring difficulties and other structural and design difficulties. Considering the angle $\lambda$ as varying over a range from —45° to +15° for example, it is further evident that as the engine speed and power increases the torque on the engine mounting units will increase and the stiffness of each unit in roll will change, with a consequent change in its natural frequency of vibration. This will permit the designer to select load conditions in such a manner as to eliminate vibration due to operation at critical frequencies of vibration. In other words by proper design the results obtainable with the present engine mounting system are subject to fairly precise determination.

Each engine mounting unit will resist power plant torque by a force $Ft$ which for any relative angular displacement of the arm 5 away from the position where $\lambda=0$ will be made up of two components $Fr$ and $Fp$ (see Fig. 6). The component $Fr$ acting along the arm 5 tends to radially compress the rubber bushing, or at least to radially stress the rubber. The component $Fp$ acting perpendicularly to the arm 5 tends to place the rubber in torsional shear. The tangential spring rate of the engine mounting unit may be expressed by an equation to be derived herewith. This the spring rate due to force $Ft$ acting tangentially with respect to the circle through arm pivot points 7. Before proceeding to the derivation attention is directed to Fig. 7 of the drawings. Here the tangential deflection of the arm 5 is indicated by the combined vector $dt$ made up of components projected to the line of action of vector $dt$ from the vector $dr$ acting along arm 5 from the vector $dp$ acting perpendicularly to arm 5.

The derivation of the equation for tangential spring rate $Kt$ will now be stated as follows:

$Ks$=axial shear spring rate.
$Kc$=radial compression spring rate.

$L = \dfrac{Kc}{Ks}$ =ratio of radial stiffness to axial stiffness.

Referring to Fig. 6 it will be seen that:

$$Fr = Ft \sin \lambda$$
$$Fp = Ft \cos \lambda$$

Referring to Fig. 7 it will be seen that:

$$dr = Fr/Kc = Ft \sin \lambda / LKs$$
$$dp = Fp/Kts = Ft \cos \lambda / L'Ks$$

Where $Kts$=torsional shear spring rate, and $$L' = \dfrac{Ks}{Kts}$$

=ratio of axial stiffness to torsional stiffness.

$$dt = \dfrac{Ft \sin^2 \lambda}{LKs} + \dfrac{Ft \cos^2 \lambda}{L'Ks}$$

$$dt = \dfrac{Ft}{Ks}\left[\dfrac{\sin^2 \lambda}{L} + \dfrac{\cos^2 \lambda}{L'}\right]$$

$$Kt = \dfrac{Ft}{dt} = \dfrac{Ks}{\dfrac{\sin^2 \lambda}{L} + \dfrac{\cos^2 \lambda}{L'}} = \text{tangential spring rate}$$

The angle $\lambda$ is at zero value when the arm 5 is perpendicular to the tangential force $Ft$. Therefore it is also true that:

When $\lambda = 0°$, $Kt = L'Ks$
When $\lambda = 90°$, $Kt = LKs$

From the above equation, values of the tangential spring rate may be plotted against the angular deflection of the bushing and arm to illustrate graphically the stiffness-deflection characteristics of the engine mounting unit. This was done in Fig. 8 wherein the deflection angles from $-90°$ to $+90°$ were transposed from a circular scale to a linear scale to give the true effect of those angular variations where $Ft$ is always a tangential force. Also the following reasonable values of $Ks$, $L$ and $L'$ were selected as follows:

$Ks$ = 3000 lbs./in., $L$ = 10, $L'$ = 1

The resulting curve of performance appears in Fig. 8 although it is understood to be merely exemplary of the performance which may be expected. Other curves might be plotted in a similar manner where assumed values above are varied somewhat. For instance the values of $L$ and $L'$ are dependent on the kind of rubber used in the bushings, thickness of the rubber, length of the bushing and other factors. For instance some vibration isolating bushings comprise two or more concentric rubber sleeves bonded to intermediate metal sleeves. Thus it will be understood that the variables in the above equation for the tangential spring rate may be varied by following known design data.

Because of the shape of the performance curve in Fig. 8 it is desirable that the mounting units operate at values of angle $\lambda$ numerically less than 45°. For instance the static condition of the engine mount may be chosen at $\lambda = -45°$ and the operating range may extend to $\lambda = +15°$ at full load condition. Such a mounting unit would operate only along the portion of the curve from (1) to (2), which portion is indicated also by a heavy line. Under these conditions the cruising power load might cause the angle $\lambda$ to fall close to zero where the tangential spring rate is at a minimum. At values of angle $\lambda$ approaching zero the component of the tangential spring rate due to radial stress on the rubber sleeve becomes larger and the effect is to stiffen the action of the mounting unit and prevent excessive deflection due to power plant torque. Since the stiffness in roll will increase with increases in angle $\lambda$, this increase in roll stiffness will coincide with increase in engine speed and power. While this will also cause an increase in the natural frequency of vibration of the mounting system, the initial value of angle $\lambda$ may be so selected as to keep the natural frequency low enough to effectively isolate roll vibrations of the power plant. The increase in roll stiffness with increases in torque and deflection minimizes engine wind-up or torquewise deflections but the careful selection of design factors and the operating range with respect to the stiffness-deflection curve will permit the natural frequency of vibration to be kept low enough to effectively isolate roll vibrations of the engine and the propeller driven thereby. It is noted furthermore that engine wind-up is more significant in power plants including a gear reduction from the engine to the propeller, a combination frequently relied on in modern aircraft propulsion practice. Since the tangential spring rate ($Kt$) does not vary greatly in traversing the lower flatter portion of the performance curve (Fig. 8), the result will be a mounting system having low natural frequencies of vibration over most of the operating range to give better than average vibration isolation. At the same time the static deflection of the mounting units will not be excessive, as in resilient engine mounts having more or less linear characteristics.

Referring now to Fig. 9 some explanation will be made of the design considerations in adapting the engine mounting units to produce a power plant mounting system in accordance with the present invention. The diagram shown represents a side elevation of the system where there may be a total of $n$ mounting units each including a metal-jacketed bushing 4, as in Figs. 1 to 4, each at a distance or radius $R$ from the torque center X—X of the engine. The center of gravity $G$ on the X—X axis is also on the Z—Z axis and a Y—Y axis through point $G$ is understood to be perpendicular to the plane including the axes X—X and Z—Z. The center of gravity $G$ is at a distance $a$ from the plane containing all the bushings 4, and the lines from point $G$ to the centers of bushings 4 make angles $\alpha$ with respect to axis X—X. Point $G$ should also coincide with the elastic center of the mount assembly in order to provide virtual center of gravity support for the power plant. Lines extending perpendicularly to the bushings 4 intersect axis X—X at point $S$ forwardly of the point $G$ and make angles $\phi$ with respect to axis X—X. Under the situation outlined the total spring rates of the mount assembly will be as follows:

Roll spring rate (about X—X axis) = $Rx = nL'KsR^2$
(where $\lambda = 0°$)

Pitch spring rate (about Y—Y axis)
Yaw spring rate (about Z—Z axis) $\bigg\} = Ry$ $$Ry = \dfrac{n}{2}Ks[L's^2 + (a \cos \phi + R \sin \phi)^2 + L(R \cos \phi - a \sin \phi)^2]$$

Translatory spring rate along X—X axis = $Kx =$
$$nKs(\sin^2 \phi + L \cos^2 \phi)$$

Translatory spring rate along Z—Z axis = $Ky =$
$$\dfrac{n}{2}Ks[L' + (\cos^2 \phi + K \sin^2 \phi)]$$

In the present power plant mounting system the power plant is supported by at least three mounting units so arranged that the elastic center of the mount assembly falls near or on the center of gravity of the power plant and propeller and particularly falls on the center of rotation (X—X axis). Since the term centro has come to mean an instantaneous center of rotation and since the term poise means the suspension of motion or vibration due to an exact balance, the present power plant mounting system may be appropriately designated by the term "centro-poise." This provides a concisely descriptive phrase to identify the present mounting system and distinguish it from other systems. It is noted also that Fig. 1 of the drawings shows in elevation an aircraft engine of the radial cylinder type but it should be understood that the present vibration-isolating power plant mounting system may be adapted for use on power plants of other types and is especially recommended for aircraft power plants used to drive propellers either directly or through gear reduction means. The rubber bushing members providing means to resiliently mount the link arms 5 may be made of natural rubber, synthetic rubber, mixtures of natural and synthetic rubber or any rubber-like compound. Moreover the rubber bushings members may be of any rubber or elastic compound reinforced or strengthened by fibers, strands, wires or fabrics according to choice or requirements of a particular installation.

The embodiments of the invention herein shown and described are to be regarded as illustrative only and it is to be understood that the invention is susceptible of variations, modifications and changes within the scope of the appended claims.

I claim:

1. An apparatus of the class described comprising a frame, a mounting ring secured to the frame, mounting means connected between said mounting ring and an engine and having a flexibility inversely proportional to engine speeds, said mounting means comprising at least three pairs of annularly disposed brackets, each pair of brackets including a bracket connected to said mounting ring and a bracket connected to said engine, a resilient bushing having an outer surface and an inner surface, one bracket in each pair bonded to the outer surface of said bushing, a rockshaft bonded to the inner surface of said bushing, a link arm rigid with said rockshaft and projecting toward the other bracket in said pair, said other bracket having an arm, said arm pivotally connected to said link arm and at an angle thereto such that engine wind up moves them into alignment subjecting said bushing initially only to a low resistance torsional shear and subsequently to a high resistance radial compression.

2. An apparatus of the class described comprising a frame, a mounting ring secured to the frame, mounting means connected between said mounting ring and said engine and having a flexibility inversely proportional to engine speeds, said mounting means comprising at least three pairs of annularly disposed brackets, each pair of brackets including a bracket connected to said mounting ring and a bracket connected to said engine, a resilient bushing having an outer surface and an inner surface, one bracket in each pair bonded to said outer surface of said bushing, a rockshaft bonded to said inner surface of said bushing, the axis of said rockshaft disposed at an acute angle to the plane of the mounting ring and in a plane perpendicular to the plane of the mounting ring that includes the radius of the mounting ring, a link arm rigid with said rockshaft and disposed at an obtuse angle to said plane of the axis of said rockshaft, said link arm projecting substantially toward the other bracket in said pair, said other bracket having an arm projecting substantially toward said rockshaft and parallel to said plane of the axis of the rockshaft, the end of said arm pivotally connected to the end of said link arm and at an angle thereto such that engine wind up moves them into alignment subjecting said bushing initially to low resistance torsional shear and subsequently the high resistance radial compression.

3. An apparatus of the class described comprising a frame, a mounting ring secured to the frame, mounting means connected between said mounting ring and an engine having a flexibility inversely proportional to engine speeds, said mounting means comprising at least three pairs of annularly disposed brackets, each pair of brackets including a bracket connected to said mounting ring and a bracket connected to said engine, a resilient bushing having an outer surface and an inner surface, said bracket connected to said mounting ring bonded to the outer surface of said bushing, a rockshaft bonded to the inner surface of said bushing, the axis of said rockshaft disposed at an acute angle to the plane of the mounting ring and in a plane perpendicular to the plane of the mounting ring that includes the radius of the mounting ring, a link arm projecting toward the bracket connected to the engine, said link arm rigid with and perpendicular to the rockshaft and disposed at an obtuse angle to said plane of the axis of the rockshaft, said bracket connected to the engine having an arm projecting out from the engine and parallel to said plane of the axis of the rockshaft, the end of said arm pivotally connected to the end of said link arm and at an angle thereto such that engine wind up moves them into alignment subjecting said bushing initially to a low resistant torsional shear and subsequently to a high resistance radial compression.

4. The apparatus set forth in claim 3 wherein said bushing is cylindrical in shape.

References Cited in the file of this patent

UNITED STATES PATENTS

| | | |
|---|---|---|
| 2,175,825 | Browne | Oct. 10, 1939 |
| 2,175,999 | Taylor | Oct. 10, 1939 |
| 2,198,842 | Renaux et al. | Apr. 30, 1940 |